(12) United States Patent
Shaw et al.

(10) Patent No.: US 12,070,160 B1
(45) Date of Patent: Aug. 27, 2024

(54) INDIVIDUAL SERVING SIZE FOOD DISPENSER

(71) Applicant: Google LLC, Mountain View, CA (US)

(72) Inventors: James Edward Shaw, Grantham (GB); Gerald Reid Harris, Pacifica, CA (US); Ignacio Alfonzo Mendez, Redwood City, CA (US); Yu Bai, Sunnyvale, CA (US); Dennis Franklin Olson, San Francisco, CA (US); Roger Nihl Re, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 18/156,717

(22) Filed: Jan. 19, 2023

Related U.S. Application Data

(60) Provisional application No. 63/300,888, filed on Jan. 19, 2022.

(51) Int. Cl.
*A47J 47/01* (2006.01)
*G01F 11/00* (2006.01)
*G01F 11/24* (2006.01)

(52) U.S. Cl.
CPC .............. *A47J 47/01* (2013.01); *G01F 11/006* (2013.01); *G01F 11/24* (2013.01)

(58) Field of Classification Search
CPC .......... A47J 47/01; G01F 11/006; G01F 11/24
See application file for complete search history.

(56) References Cited

U.S. PATENT DOCUMENTS

| | | | | |
|---|---|---|---|---|
| 3,115,276 A | * | 12/1963 | Johanningmeier | G05D 11/00 222/413 |
| 4,055,255 A | * | 10/1977 | Vasquez | G01G 13/20 414/21 |
| 4,090,622 A | * | 5/1978 | Smith | C21D 9/0031 432/103 |
| 4,118,164 A | * | 10/1978 | Wenger | B29C 48/2564 425/208 |
| 4,185,123 A | * | 1/1980 | Wenger | A23J 3/227 426/802 |
| 4,189,063 A | * | 2/1980 | Matthiesen | G07F 11/44 222/413 |
| 4,323,321 A | * | 4/1982 | Dale | E01C 19/407 404/105 |

(Continued)

FOREIGN PATENT DOCUMENTS

CN 109691914 A * 4/2019 ............. A47J 47/01

*Primary Examiner* — Frederick C Nicolas
(74) *Attorney, Agent, or Firm* — DORITY & MANNING P.A.

(57) ABSTRACT

An individual serving size food dispenser includes a casing defining an interior volume configured for receipt of bulk food. An opening of the casing is positioned proximate a bottom portion of the interior volume. An auger is disposed within the interior volume of the casing. The auger includes a first flighting portion and a second flighting portion. The first and second flighting portions are wound in opposite directions. An auger motor is coupled to the auger such that the auger motor is operable to rotate the auger within the interior volume of the casing. A door assembly is positioned proximate the opening of the casing. The door assembly is configured for selectively opening to dispense bulk food from the opening of the casing.

19 Claims, 6 Drawing Sheets

(56) References Cited

U.S. PATENT DOCUMENTS

| | | | | |
|---|---|---|---|---|
| 4,454,030 A * | 6/1984 | Young | B07B 13/04 | 209/660 |
| 4,493,442 A * | 1/1985 | Hanson, Jr. | B65G 47/78 | 222/486 |
| 4,555,212 A * | 11/1985 | Jones | B65B 69/0008 | 414/412 |
| 4,788,830 A * | 12/1988 | Schreiner | F25C 5/182 | 62/344 |
| 4,790,457 A * | 12/1988 | Morse | A47F 1/035 | 222/533 |
| 4,802,609 A * | 2/1989 | Morse | A47F 1/035 | 222/424.5 |
| 5,054,657 A * | 10/1991 | Morse | A47F 1/03 | 222/162 |
| 5,098,247 A * | 3/1992 | Campbell | B65G 65/365 | 414/326 |
| 5,222,634 A * | 6/1993 | Hayes | G01F 11/282 | 222/413 |
| 5,395,286 A * | 3/1995 | Sgariboldi | B01F 33/5023 | 366/603 |
| 5,826,754 A * | 10/1998 | Ishaya | A47F 1/03 | 222/413 |
| 5,827,038 A * | 10/1998 | Barden | E02F 3/407 | 37/903 |
| 5,871,619 A * | 2/1999 | Finley | C10B 33/02 | 198/545 |
| 6,062,438 A * | 5/2000 | Ellis | A47F 1/035 | 222/413 |
| 7,461,763 B1 * | 12/2008 | Winn | B65G 65/46 | 222/413 |
| 7,832,598 B2 * | 11/2010 | Rode | G01F 13/005 | 222/311 |
| 8,714,363 B2 * | 5/2014 | Bezuidenhout | B29C 31/02 | 209/276 |
| 2008/0264978 A1* | 10/2008 | Rode | G01F 13/005 | 222/413 |
| 2013/0126556 A1* | 5/2013 | Riester | A23G 9/22 | 222/413 |
| 2014/0374519 A1* | 12/2014 | Davis | A23G 9/045 | 241/101.8 |
| 2019/0313834 A1* | 10/2019 | Bertness | B65G 65/46 | |

\* cited by examiner

INDIVIDUAL SERVING SIZE FOOD DISPENSER

CROSS-REFERENCE TO RELATED APPLICATION

The present application is related and claims priority to U.S. Provisional Patent No. 63/300,888 filed in the United States Patent & Trademark Office on Jan. 19, 2022, which is incorporated by reference in its entirety for all purposes.

FIELD

The present disclosure relates generally to food dispensing systems. Moreover, a dispenser for individual sized food portions.

BACKGROUND

Modern workspaces frequently include kitchen spaces designed to provide warm, inviting for employees to recharge and connect. Such kitchen spaces may offer beverages and snacks for employee consumption. However, conventional food and beverage packaging has drawbacks. Food and beverages packaged for individual consumption can generate significant waste. Moreover, packaged snack food can contribute a significant volume of non-recyclable waste, such as plastic, particularly for large companies with many employees. Bulk food and beverage packaging generates less waste relative to individually packaged portions; however, conventional systems for dispensing bulk food also have drawbacks. For instance, dispensing individualized portions of food can be difficult, user may consume more food without pre-portioned individual amounts, etc. waste due to spoilage and breakage, additional labor to clean and stock, and food safety concerns.

SUMMARY

Aspects and advantages of embodiments of the present disclosure will be set forth in part in the following description, or may be learned from the description, or may be learned through practice of the embodiments.

Aspects of the present disclosure are directed to an individual serving size food dispenser that includes a casing defining an interior volume configured for receipt of bulk food. An opening of the casing is positioned proximate a bottom portion of the interior volume. An auger is disposed within the interior volume of the casing. The auger includes a first flighting portion and a second flighting portion. The first and second flighting portions are wound in opposite directions. An auger motor is coupled to the auger such that the auger motor is operable to rotate the auger within the interior volume of the casing. A door assembly is positioned proximate the opening of the casing. The door assembly is configured for selectively opening to dispense bulk food from the opening of the casing.

Aspects of the present disclosure are also directed to an individual serving size food dispenser that includes a casing defining an interior volume configured for receipt of bulk food. An opening of the casing is positioned proximate a bottom portion of the interior volume. An auger is disposed within the interior volume of the casing. The auger includes a first flighting portion and a second flighting portion. The first and second flighting portions are wound in opposite directions. An auger motor is coupled to the auger such that the auger motor is operable to rotate the auger in a rotational direction within the interior volume of the casing. A door assembly is positioned proximate the opening of the casing. The door assembly is configured for selectively opening to dispense bulk food from the opening of the casing. The door assembly includes a cylindrical door and a door motor. The cylindrical door is positioned at the opening of the casing. The door motor is operable to rotate the cylindrical door. The cylindrical door defines a dispensing volume. An open end of the dispensing volume faces toward the interior volume of the casing in a closed position of the cylindrical door. The open end of the dispensing volume faces away from the interior volume of the casing in an open position of the cylindrical door. The dispensing volume of the cylindrical door is no greater than a tenth of the interior volume of the casing.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures.

DETAILED DESCRIPTION

Figure 1:
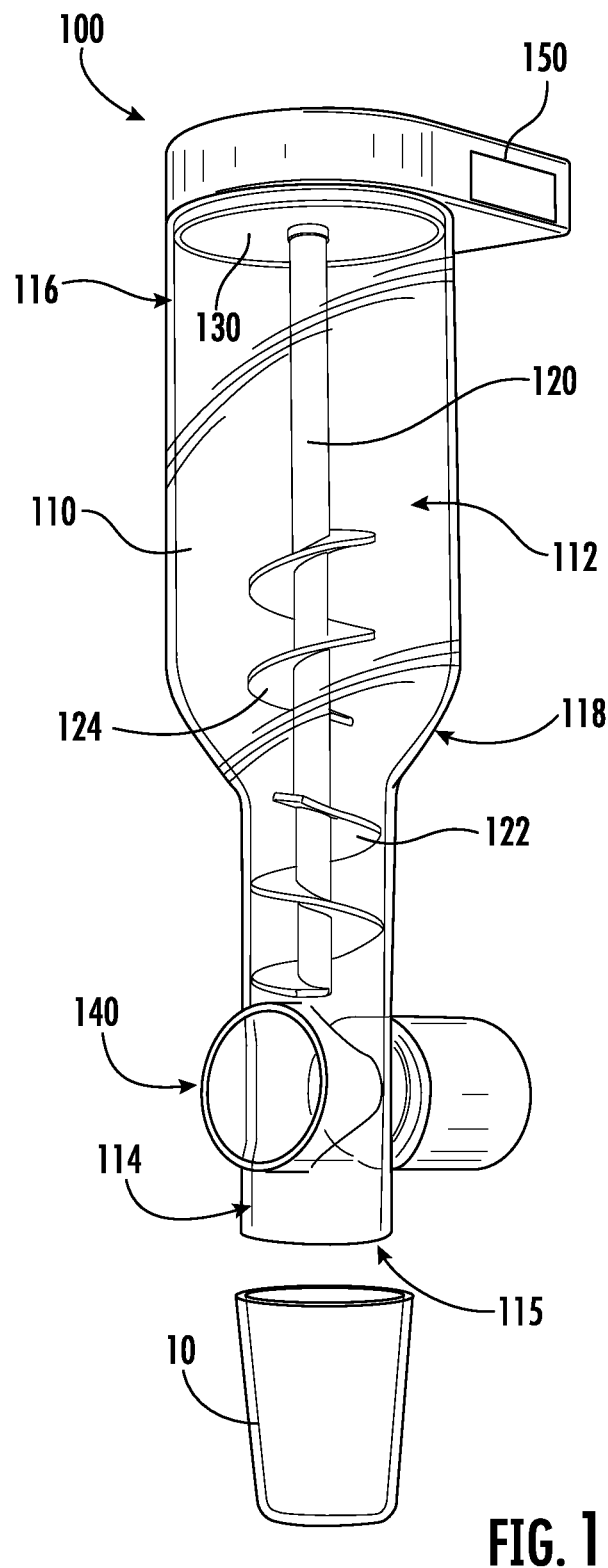
FIG. 1 is a perspective view of a food dispenser for individual sized portions according to an example embodiment of the present subject matter.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Generally, the present disclosure is directed to a dispenser for bulk food. The dispenser can assist with reducing consumption of single use plastic packaging. For example, an employer can provide the dispenser within a common space, such as a kitchen area, to provide snacks for employees without providing individual portions within single use plastic packaging. Thus, the dispenser according to example aspects of the present disclosure can safely provide individual portions of bulk food to users.

The dispenser can dispense a variety of bulk food in individual portions. For instance, the dispenser can be configured to dispense nuts, cereal, snack mix, pretzels, chips, dried fruit, candy, gummies, etc. Moreover, the dispenser can be configured to dispense different types of bulk foods in individual portions, e.g., by adjusting the dispense rate. Thus, the dispense rate of the dispenser may be adjusted depending on the type of bulk food within the dispenser in order to assist with portion control. The dispenser may also dispense bulk food without a user touching the bulk food within the dispenser, i.e., touchless dispensing. The dispenser may also include a door that seals the bulk food within the dispenser after each dispenser to assist with keeping the bulk food fresh.

Turning now to FIG. 1, an individual serving size food dispenser 100 includes a casing 110, an auger 120, an auger motor 130, and a door assembly 140. Dispenser 100 may be mounted to a wall. For example, casing 110 may be removably mounted to the wall with a wall bracket 101. Other components of dispenser 100 may be mounted to casing 110. For instance, auger 120 and door assembly 140 may be mounted to casing 110. As another example, auger motor 130 may be disposed within wall bracket 101.

Casing 110 may define an interior volume 112. Moreover, casing 110 may extend between a top portion 116 and a bottom portion 114, e.g., along a vertical direction. Casing 110 may define an opening 115 at or proximate bottom portion 114 of casing 110. Thus, interior volume 112 may include an open end at bottom portion 114 of casing 110. Conversely, interior volume 112 may include a closed end at top portion 116 of casing 110. Thus, e.g., interior volume 112 may be inaccessible at top portion 116 of casing 110. In alternative example embodiments, casing 110 may define another opening at or proximate top portion 116 of casing 110.

Figure 2:
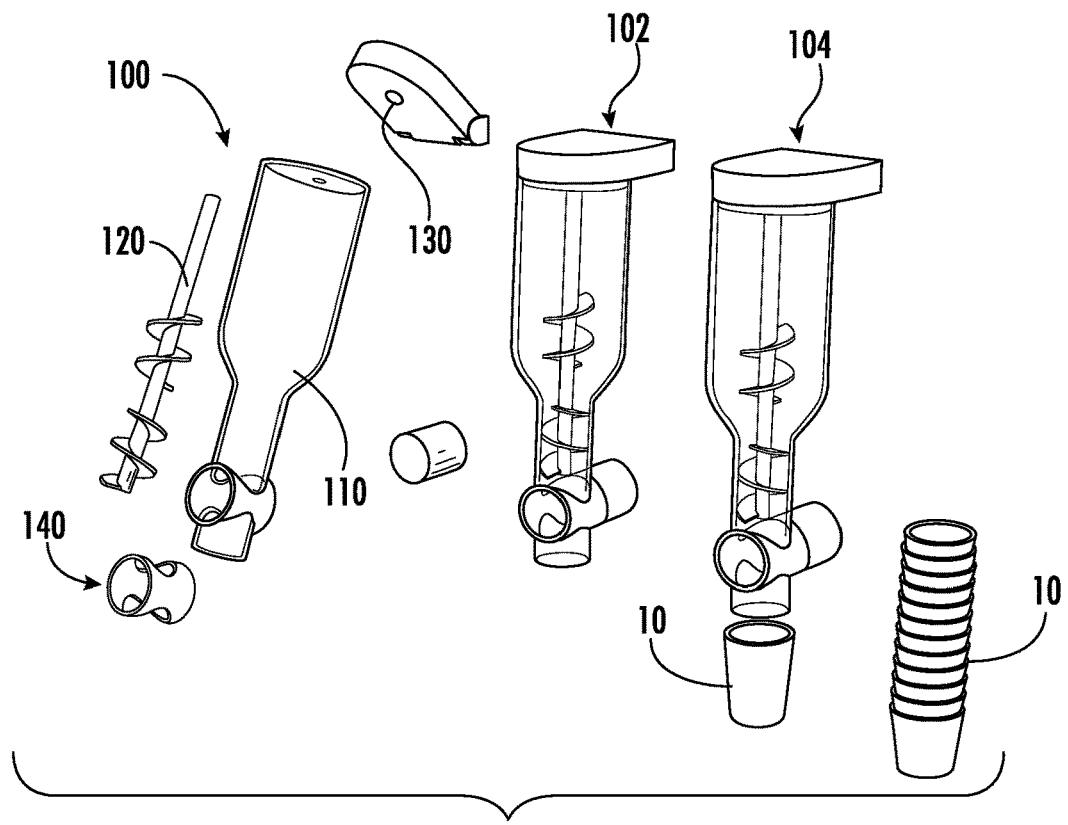
FIG. 2 is a perspective view of a system of the example food dispensers of FIG. 1.
Figure 3:
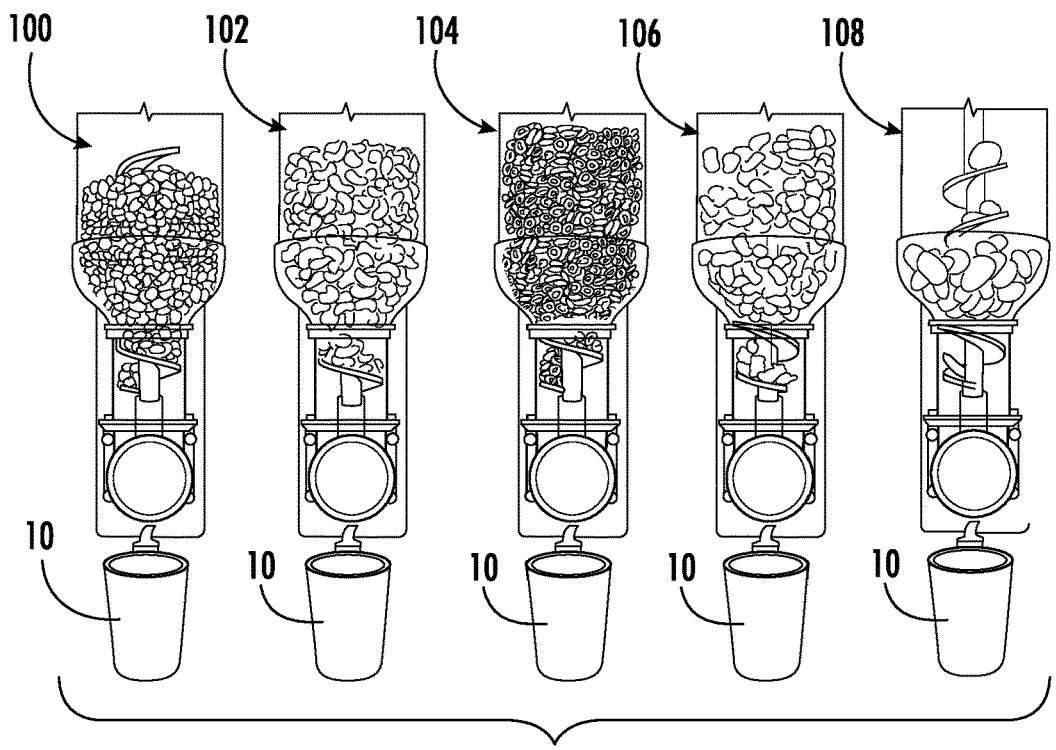
FIG. 3 is a front, plan view of the system of FIG. 2.

Interior volume 112 may be configured for receipt of bulk food. Casing 110 may be filled with any suitable bulk food. For instance, interior volume 112 may be loaded with cereal, nuts, snack mix, pretzels, chips, candy, gummies, dried fruit, etc. Thus, e.g., with reference to FIGS. 2 and 3, a plurality of dispensers 100, 102, 104, 106, 108 may be installed at a location, and each of the plurality of dispensers 100, 102, 104, 106, 108 may be loaded with a different bulk food. Thus, a user may select a respective one of the plurality of dispensers 100, 102, 104, 106, 108 for a desired snack food. Each of the plurality of dispensers 100, 102, 104, 106, 108 may be constructed in the same or similar manner to that described below for dispenser 100.

Turning back to FIG. 1, casing 110 may be configured to only allow access to bulk food within interior volume 112 through opening 115. Thus, e.g., interior volume 112 may be closed except at opening 115, and bulk food may be loaded into and dispensed from interior volume 112 through opening 115 at bottom portion 114 of casing 110. For example, dispenser 100 may be configured such that casing 110 is pre-loaded with bulk food and replaced when the bulk food is depleted or expired. Thus, e.g., casing 110 may be shipped to a location with dispenser 100 filled with bulk food, and the replaced, empty casing 110 may be shipped back to a facility for refilling, recycling, etc. As an alternative, casing 110 may define another opening at or proximate top portion 116 of casing 110, as noted above, and a user may refill casing 110, e.g., in situ, through such opening at or proximate top portion 116.

Interior volume 112 of casing 110 may be sized to contain a multitude of individual portions of the bulk food. For instance, interior volume 112 of casing 110 may be no less than one and half liters (1.5 L) and no greater than twenty liters (20 L) in certain example embodiments. Such sizing may advantageously allow interior volume 112 of casing 110 to hold enough bulk food for ten (10), twenty (20), fifty (50), one hundred (100), etc. individual portions of the bulk food.

A cross-sectional area of interior volume 112 may decrease or taper towards bottom portion 114 of casing 110. Thus, e.g., as shown in FIG. 1, interior volume 112 of casing 110 may have a first width at or proximate top portion 116 of casing 110, and interior volume 112 of casing 110 may have a second width at or proximate bottom portion 114 of casing 110. The first width at or proximate top portion 116 of casing 110 may be greater than the second width at or proximate bottom portion 114 of casing 110. For instance, first width at or proximate top portion 116 of casing 110 may be no less than fifteen centimeters (15 cm) and no greater than sixty centimeters (60 cm), and the second width at or proximate bottom portion 114 of casing 110 may be no less than five centimeters (5 cm) and no greater than fifteen centimeters (15 cm). A tapered section 118 (e.g., at a middle portion of casing 110) may transition interior volume 112 from the first width at or proximate top portion 116 of casing 110 to the second width at or proximate bottom portion 114 of casing 110. Tapered section 118 may also define a funnel for bulk food within interior volume 112 of casing 110. For instance, bulk food within interior volume 112 above tapered section 118 may slide on tapered section 118 towards opening 115. Such shaping of interior volume 112 may facilitate storage of a large volume of bulk food within interior volume 112 while also facilitating dispensing of the bulk food from interior volume 112 via opening 115, as discussed in greater detail below.

Auger 120 may be disposed within interior volume 112 of casing 110. Auger includes a first flighting portion 122 and a second flighting portion 124. First and second flighting portions 122, 124 may be wound in opposite directions. Auger motor 130 may be coupled to auger 120. Thus, auger motor 130 may be operable to rotate auger 120 within interior volume 112 of casing 110. Auger motor 130 may be positioned at top portion 116 of casing 110, e.g., within wall bracket 101. As an example, auger motor 130 may be a stepper motor operable to rotate a rotor by a selected number of defined rotational degrees.

First flighting portion 122 of auger 120 may be positioned at bottom portion 114 of casing 110, and second flighting 124 of auger 120 may be positioned above bottom portion 114 of casing 110. For example, as shown in FIG. 1, first flighting portion 122 of auger 120 may be positioned at bottom portion 114 of casing 110 above opening 115, and first flighting portion 122 of auger 120 may be wound such that rotation of auger 120 by auger motor 130 may urge bulk food within interior volume 112 towards opening 115 via first flighting portion 122 of auger 120. Moreover, first flighting portion 122 of auger 120 may urge bulk food within interior volume 112 towards opening 115 during operation of dispenser 100. Conversely, second flighting 124 of auger 120 may be positioned above bottom portion 114 of casing 110 at and above tapered section 118, and second flighting portion 122 of auger 120 may be wound such that rotation of auger 120 by auger motor 130 may urge the bulk food within interior volume 112 away from opening 115 via second flighting portion 124 of auger 120. Moreover, second flighting portion 124 of auger 120 may lift or fluff the bulk food within interior volume 112 during operation of dispenser 100, e.g., and thus prevent or limit the bulk food within interior volume from settling towards opening 115 and thereby jamming auger 120 or another portion of dispenser 100. Accordingly, first and second flighting portions 122, 124 may cooperate to dispense a variety of bulk food from dispenser 100.

Figure 6:
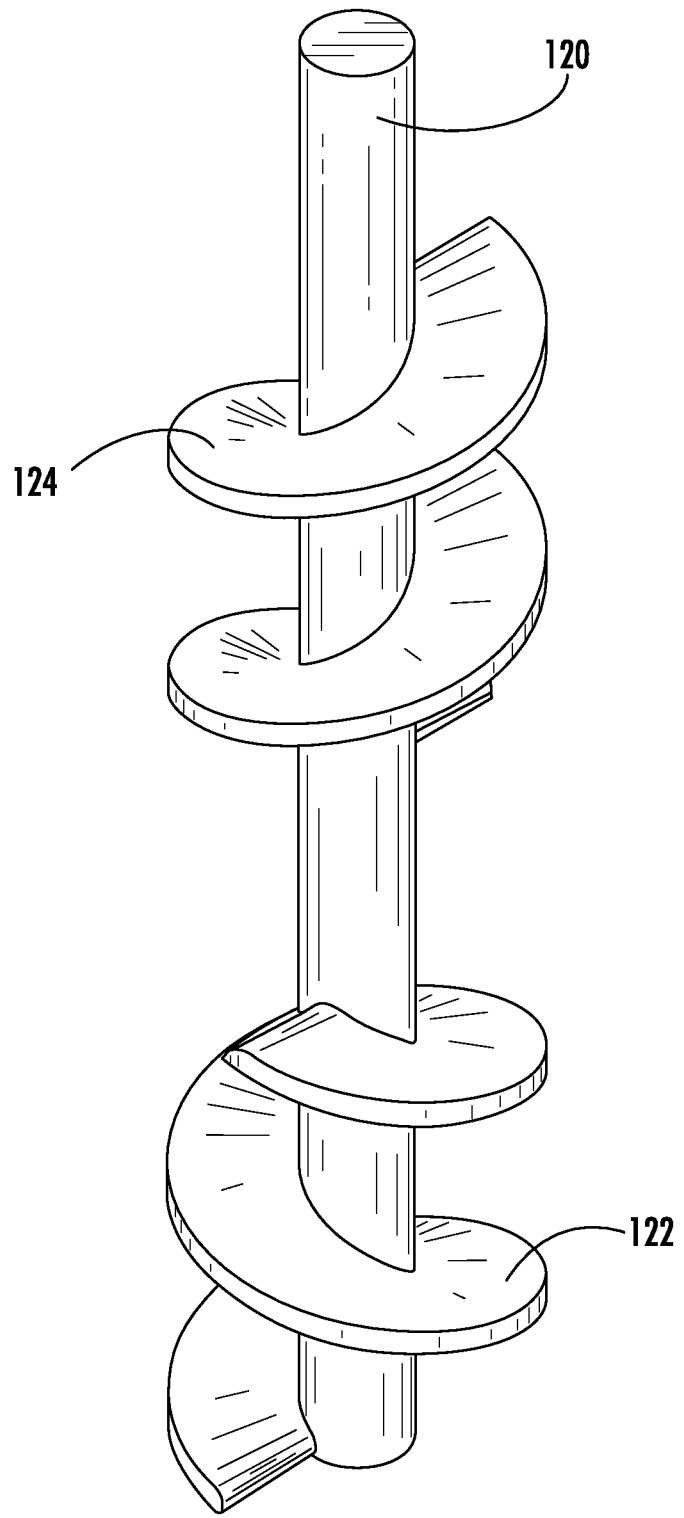
FIG. 6 is a perspective view of an auger of the example food dispensers of FIG. 1.

At least a portion of first flighting portion 122 of auger 120 may be positioned within casing 110 at or proximate bottom portion 114 of casing 110, e.g., with the second width. Conversely, at least a portion of second flighting portion 124 of auger 120 may be positioned within casing 110 at or proximate top portion 116 of casing 110, e.g., with the first width. Moreover, at least a portion of second flighting portion 124 of auger 120 may be positioned within casing 110 at or proximate tapered section 118. Thus, e.g., as shown in FIG. 6, first and second flighting portions 122, 124 may be axially spaced apart on auger 120. For instance, an axial gap between first and second flighting portions 122, 124 may be no less than three centimeters (3 cm) and no greater than fifteen centimeters (15 cm). As another example, the axial gap between first and second flighting portions 122, 124 may be no less than five centimeters (5 cm) in certain example embodiments.

A width of first flighting portion 122, e.g., along a radial direction, may be selected to complement casing 110 at or proximate bottom portion 114 of casing 110, e.g., with the second width. Moreover, the width of first flighting portion 122 may be about equal to the second width of interior volume 112 at or proximate bottom portion 114 of casing 110. Thus, e.g., first flighting portion 122 may extend (e.g., radially) across interior volume 112 at or proximate bottom portion 114 of casing 110. Conversely, a width of second flighting portion 124, e.g., along the radial direction, may be substantially less than interior volume 112 at or proximate top portion 116 of casing 110, e.g., with the first width. Moreover, the width of second flighting portion 124 may be substantially less than the first width of interior volume 112 at or proximate top portion 116 of casing 110. Thus, e.g., second first flighting portion 122 may not extend (e.g., radially) across interior volume 112 at or proximate top portion 116 of casing 110. Moreover, the width of second flighting portion 124 may be about equal to the width of first flighting portion 122 in certain example embodiments. Such sizing of second flighting portion 124 relative to interior volume 112 may facilitate lifting of bulk food within interior volume 112 without interfering with casing 110. However, it will be understood that the width of second flighting portion 124, e.g., along the radial direction, may be about equal to the first width of interior volume 112 at or proximate top portion 116 of casing 110 in alternative example embodiments.

Auger motor 130 may be configured to rotate auger 120 in a rotational direction, e.g., either clockwise or counter-clockwise. First flighting portion 122 of auger 120 may be wound in a direction complementary to the rotational direction of auger motor 130. For example, when auger motor 130 is operable to rotate auger 120 clockwise (e.g., when viewed from opening 115), first flighting portion 122 of auger 120 may have a right-hand flighting direction. Conversely, second flighting portion 124 of auger 120 may have a left-hand flighting direction when auger motor 130 is operable to rotate auger 120 clockwise (e.g., when viewed from opening 115). As another example, when auger motor 130 is operable to rotate auger 120 counter-clockwise (e.g., when viewed from opening 115), first flighting portion 122 of auger 120 may have a left-hand flighting direction. Conversely, second flighting portion 124 of auger 120 may have a right-hand flighting direction when auger motor 130 is operable to rotate auger 120 counter-clockwise (e.g., when viewed from opening 115). Such winding arrangements for auger 120 may assist with dispensing bulk food from opening 115 via first flighting portion 122 of auger 120 and with lifting bulk food within interior volume 112 away from opening 115 via second flighting portion 124 of auger 120 during rotation of auger 120.

Figure 4:
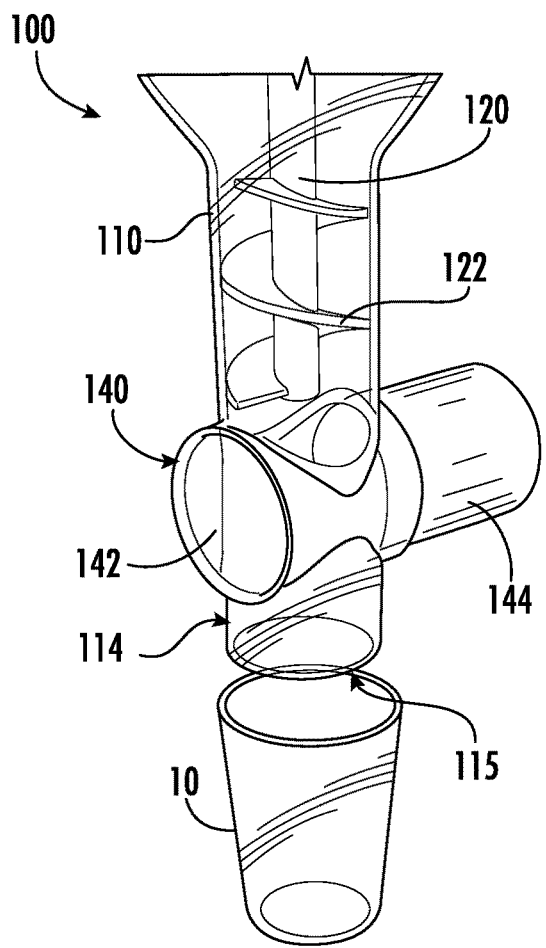
FIG. 4 is a perspective view of a door assembly of the example food dispensers of FIG. 1.
Figure 5:
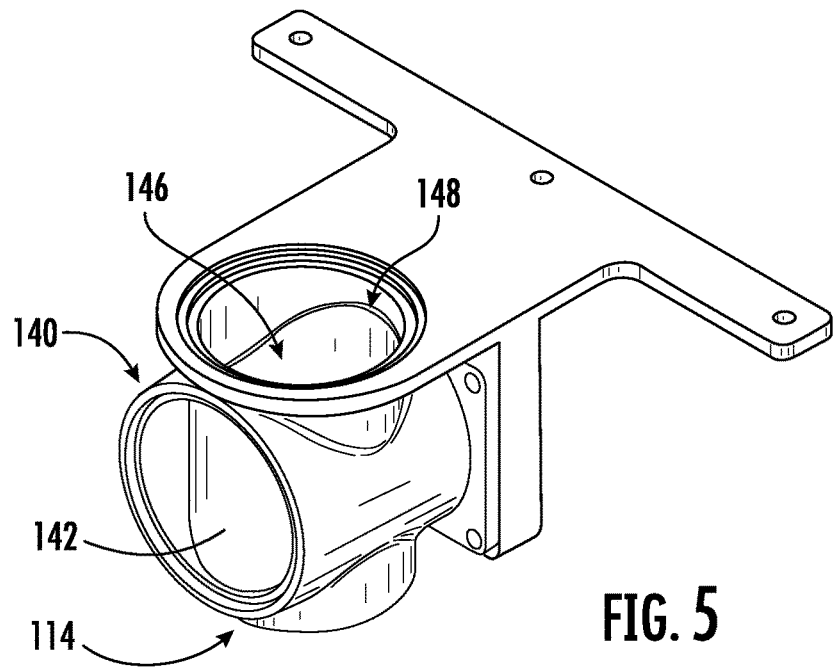
FIG. 5 is another perspective view of a door assembly according to an example embodiment of the present subject matter.

Turning back to FIG. 1, door assembly 140 may be positioned proximate opening 115 of casing 110. Door assembly 140 may be configured for selectively opening to dispense bulk food from opening 115 of casing 110. With reference to FIGS. 4 and 5, door assembly 140 may include a cylindrical door 142 and a door motor 144. Cylindrical door 142 may be positioned at opening 115 of casing 110, and door motor 144 may be operable to rotate cylindrical door 142. Moreover, cylindrical door 142 may define a dispensing volume 146. Dispensing volume 146 may have an open end 148, and an opposite end of dispensing volume 146 may be closed. Thus, e.g., dispensing volume 146 may be configured to only be accessible at open end 148. By rotating cylindrical door 142, open end 148 may move relative to interior volume 112 and opening 115. Moreover, door motor 144 may rotate cylindrical door 142 between an open position and a closed position. Open end 148 of dispensing volume 146 may face toward interior volume 112 of casing 110 and auger 120 in the closed position. Thus, e.g., bulk food from interior volume 112 may flow into dispensing volume 146 at open end 148 when cylindrical door 142 is in the closed position. Conversely, open end 148 of dispensing volume 146 may face away from interior volume 112 of casing 110 and toward opening 115 in the open position. Thus, e.g., bulk food from dispensing volume 146 may exit cylindrical door 142 via open end 148 and exit dispenser 100 at opening 115 when cylindrical door 142 is in the open position.

As noted above, door motor 144 may selectively rotate cylindrical door 142 open and closed. However, cylindrical door 142 may block direct access to interior volume 112 regardless of whether cylindrical door 142 is open or closed. Moreover, cylindrical door 142 may limit air flow to bulk food within interior volume 112 and thus may increase storage time and freshness of bulk food within interior volume 112.

Cylindrical door 142 may also facilitate dispensing of individual portions of the bulk food from interior volume 112. For example, dispensing volume 146 may be sized to receive an individual portion of bulk food. Moreover, dispensing volume 146 may be no less than two hundred milliliters (200 mL) and no greater than five hundred milliliters (500 mL) in certain example embodiments. Such sizing may advantageously allow dispensing volume 146 of cylindrical door 142 to hold enough bulk food for an individual portion of the bulk food. Thus, e.g., auger 120 may rotate to fill dispensing volume 146 of cylindrical door 142 with a portion of the bulk food from interior volume 112. In certain example embodiments, dispensing volume 146 of cylindrical door 142 may be less than interior volume 112 of casing 110. For instance, dispensing volume 146 of cylindrical door 142 may be no greater than a tenth (1/10) of interior volume 112 of casing 110 and/or no less than a hundredth (1/100) of interior volume 112 of casing 110. Thus, as noted above, interior volume 112 of casing 110 may be sized to hold enough bulk food for a multitude of individual portions of the bulk food, and dispensing volume 146 of cylindrical door 142 may be sized to hold each individual portion of the bulk food prior to dispensing the bulk food from opening 115.

As noted above, casing 110 may be filled with any suitable bulk food, such as cereal, nuts, snack mix, pretzels, chips, candy, gummies, dried fruit, etc. Dispenser 100 may be adjustable to facilitate dispensing of each type of bulk food. For example, dispenser 100 may include a controller 150. The operation of dispenser 100, including motors 130, 144, may be controlled by a processing device, such as a controller 150, which may include a microprocessor or other device that is in operative communication with components of dispenser 100.

Controller 150 may include a memory and microprocessor, such as a general or special purpose microprocessor operable to execute programming instructions or microcontrol code associated with a cleaning cycle. The memory may represent random access memory such as DRAM, and/or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. The various operational components of dispenser 100 may be in communication with controller 150 via one or more signal lines or shared communication busses.

When auger motor 130 is a stepper motor, controller 150 may be configured to adjust a number of steps rotated by auger motor 130. Moreover, controller 150 may be configured to adjust a number of steps rotated by auger motor 130 based at least in part on a type of the bulk food within interior volume 112. For instance, for sticky bulk food, such as candy, gummies, dried fruit, etc., controller 150 may increase the number of steps rotated by auger motor 130 during dispensing. Conversely, for dry bulk food, such as cereal, nuts, snack mix, pretzels, chips, etc., controller 150 may decrease the number of steps rotated by auger motor 130 during dispensing. It will be understood that a respective number of steps rotated by auger motor 130 may be predetermined for each type of bulk food.

Figure 7:
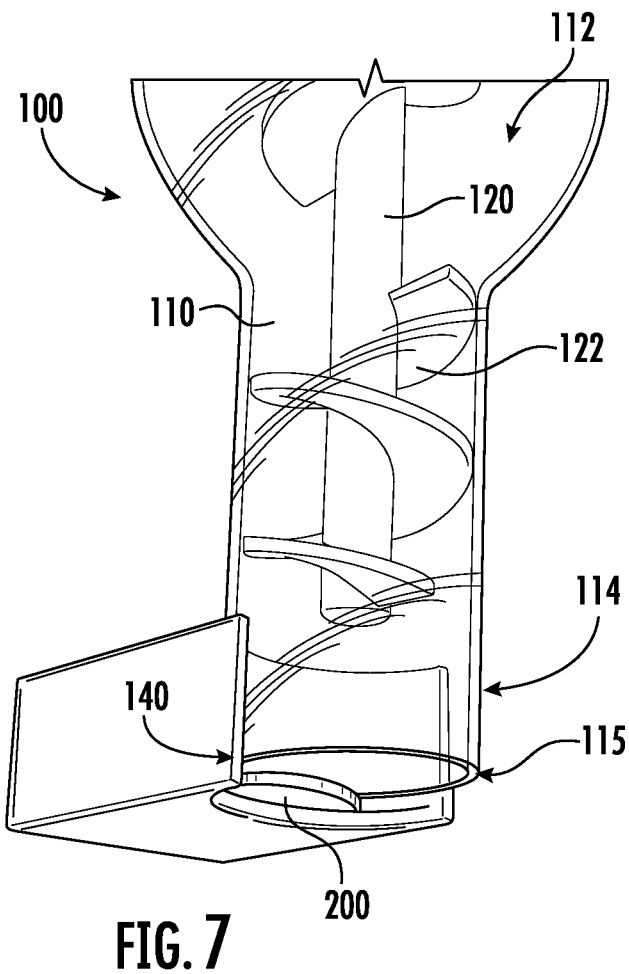
FIG. 7 is another perspective view of a door assembly according to an example embodiment of the present subject matter.
Figure 8:
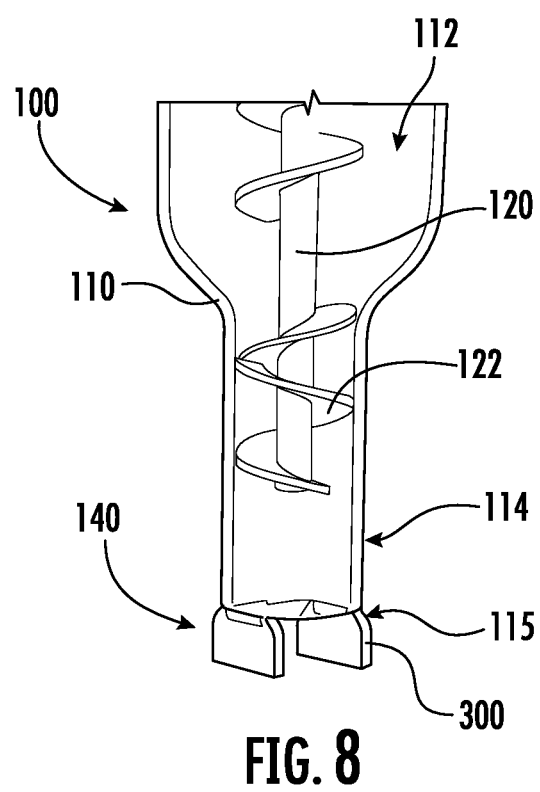
FIG. 8 is another perspective view of a door assembly according to an example embodiment of the present subject matter.

With reference to FIGS. 7 and 8, dispenser 100 may include other forms of door assembly in alternative example embodiments. In FIG. 7, door assembly 140 includes a sliding door 200. Sliding door 200 may be positioned at opening 115 of casing 110. Door motor 144 may be coupled to sliding door 200 and may be operable to adjust sliding door 200 between a closed position (not shown) and an open position (FIG. 7). Sliding door 200 may limit air flow to bulk food within interior volume 112 and thus may increase storage time and freshness of bulk food within interior volume 112. In FIG. 8, door assembly 140 includes a pair of French doors 300. French doors 300 may be positioned at opening 115 of casing 110. Door motor 144 may be coupled to French doors 300 and may be operable to adjust French doors 300 between a closed position (not shown) and an open position (FIG. 8). French doors 300 may limit air flow to bulk food within interior volume 112 and thus may increase storage time and freshness of bulk food within interior volume 112.

Figure 9:
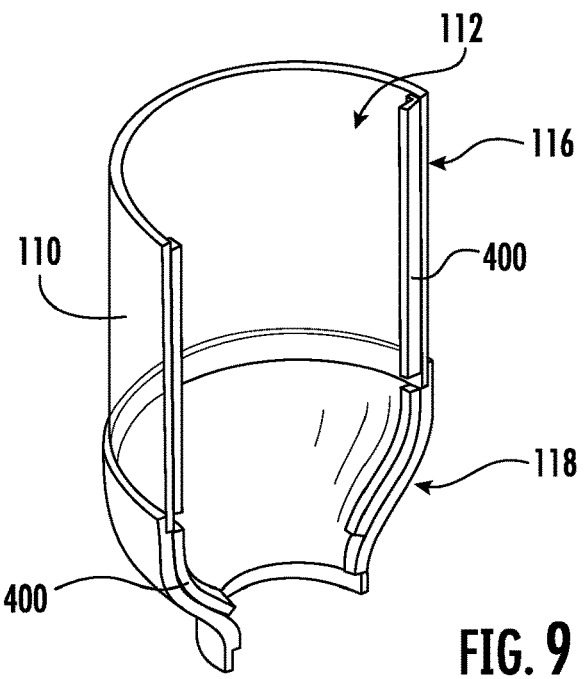
FIG. 9 is a perspective, section view of a casing according to an example embodiment of the present subject matter.

As shown in FIG. 9, casing 110 may include at least one projection 400, such as a plurality of projections. Projection(s) 400 may include one or more of ribs, posts, poles, splines, etc. that extend radially into interior volume 112 of casing 110. Projection(s) 400 may assist with breaking up clumps of bulk food within interior volume 112, e.g., during rotation of auger 120. Projection(s) 400 may be distributed, e.g., circumferentially and/or axially, on an inner surface of casing 110 that faces interior volume 112. In certain example embodiments, projection(s) 400 may be positioned at or adjacent one or both of top portion 116 and tapered section 118 of casing 110.

Figure 10:
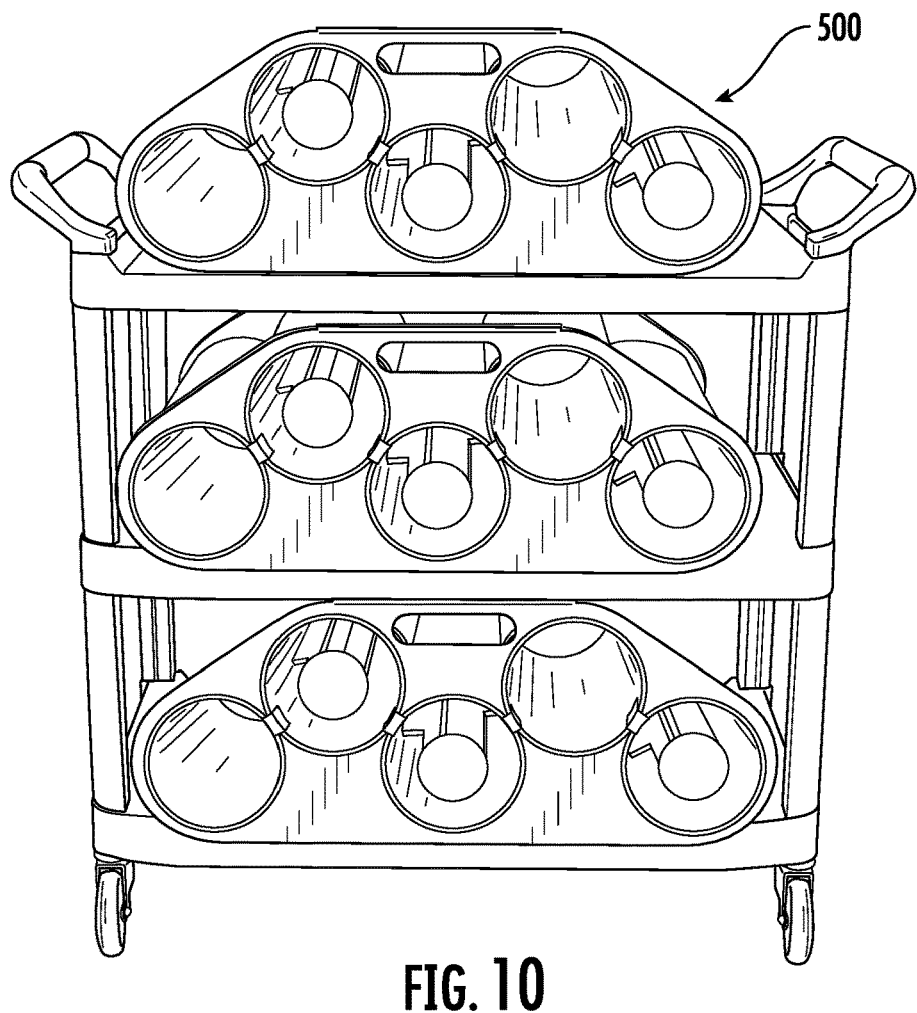
FIG. 10 is a front view of a service cart according to an example embodiment of the present subject matter.

Dispenser(s) 100, 102, 104, 106, 108 may be installed within a common space, such as a kitchen area, to provide snacks for employees in individually sized portions. Dispenser(s) 100, 102, 104, 106, 108 may dispense bulk food without a user touching the bulk food therein, i.e., touchless dispensing. Dispenser(s) 100, 102, 104, 106, 108 may also seal the bulk food therein after each dispenser to assist with keeping the bulk food fresh. As shown in FIG. 10, a service cart 500 may carry replacement casings 110. The replacement casings 110 may be pre-loaded with bulk food and installed in dispenser 100 when the bulk food is depleted or expired. The empty casings 110 may be carried away on service cart 500 for refilling, servicing, recycling, etc. As may be seen from the above, the present disclosure may advantageously provide an automated portion control snack dispenser that is configured to dispense bulk food in individual portions.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An individual serving size food dispenser, comprising:
   a casing defining an interior volume configured for receipt of bulk food, an opening of the casing positioned proximate a bottom portion of the interior volume;

an auger disposed within the interior volume of the casing, the auger comprising a first flighting portion and a second flighting portion, the first and second flighting portions wound in opposite directions;

an auger motor coupled to the auger such that the auger motor is operable to rotate the auger within the interior volume of the casing; and a door assembly positioned proximate the opening of the casing, the door assembly A configured for selectively opening to dispense the bulk food from the opening of the casing.

2. The dispenser of claim 1, wherein the interior volume of the casing is no less than one and half liters and no greater than twenty liters.

3. The dispenser of claim 1, wherein a cross-sectional area of the interior volume tapers at the bottom portion of the casing.

4. The dispenser of claim 3, wherein the first flighting portion of the auger is positioned at the bottom portion of the casing, and the second flighting of the auger is positioned above the bottom portion of the casing.

5. The dispenser of claim 4, wherein a width of the first flighting portion of the auger is about equal to a width of the interior volume at the bottom portion of the casing.

6. The dispenser of claim 5, wherein a width of the second flighting portion of the auger is about equal to the width of the first flighting portion of the auger.

7. The dispenser of claim 1, wherein the auger motor is operable to rotate the auger in a rotational direction, and a direction of the first flighting portion of the auger is complementary to the rotational direction.

8. The dispenser of claim 1, wherein the door assembly comprises a pair of French doors positioned at the opening of the casing.

9. The dispenser of claim 1, wherein the door assembly comprises a sliding door positioned at the opening of the casing.

10. The dispenser of claim 1, wherein the door assembly comprises a cylindrical door and a door motor, the cylindrical door positioned at the opening of the casing, the door motor operable to rotate the cylindrical door.

11. The dispenser of claim 10, wherein the cylindrical door defines a dispensing volume, an open end of the dispensing volume facing toward the interior volume of the casing in a closed position of the cylindrical door, the open end of the dispensing volume facing away from the interior volume of the casing in an open position of the cylindrical door.

12. The dispenser of claim 11, wherein the dispensing volume of the cylindrical door is no greater than a tenth of the interior volume of the casing.

13. The dispenser of claim 1, wherein the auger motor is positioned above a top portion of the interior volume of the casing.

14. The dispenser of claim 1, further comprising a controller in operative communication with the auger motor, wherein the auger motor is a stepper motor, and the controller is configured to adjust a number of steps rotated by the stepper motor based at least in part on a type of the bulk food.

15. The dispenser of claim 1, wherein the casing comprises at least one projection extending radially into the interior volume of the casing.

16. The dispenser of claim 1, wherein the first and second flighting portions are axially spaced apart on the auger.

17. The dispenser of claim 16, wherein a gap between the first and second flighting portions on the auger is no less than fifty millimeters.

18. The dispenser of claim 1, further comprising a wall bracket, the casing selectively mountable to the wall bracket.

19. An individual serving size food dispenser, comprising:

a casing defining an interior volume configured for receipt of bulk food, an opening of the casing positioned proximate a bottom portion of the interior volume;

an auger disposed within the interior volume of the casing, the auger comprising a first flighting portion and a second flighting portion, the first and second flighting portions wound in opposite directions;

an auger motor coupled to the auger such that the auger motor is operable to rotate the auger in a rotational direction within the interior volume of the casing; and a door assembly positioned proximate the opening of the casing, the door assembly configured for selectively opening to dispense the bulk food from the opening of the casing, the door assembly comprising a cylindrical door and a door motor, the cylindrical door positioned at the opening of the casing, the door motor operable to rotate the cylindrical door, wherein the cylindrical door defines a dispensing volume, an open end of the dispensing volume facing toward the interior volume of the casing in a closed position of the cylindrical door, the open end of the dispensing volume facing away from the interior volume of the casing in an open position of the cylindrical door, and wherein the dispensing volume of the cylindrical door is no greater than a tenth of the interior volume of the casing.

* * * * *